Feb. 23, 1926.
L. H. KOLL
FLYTRAP
Filed Dec. 4, 1922
1,574,426
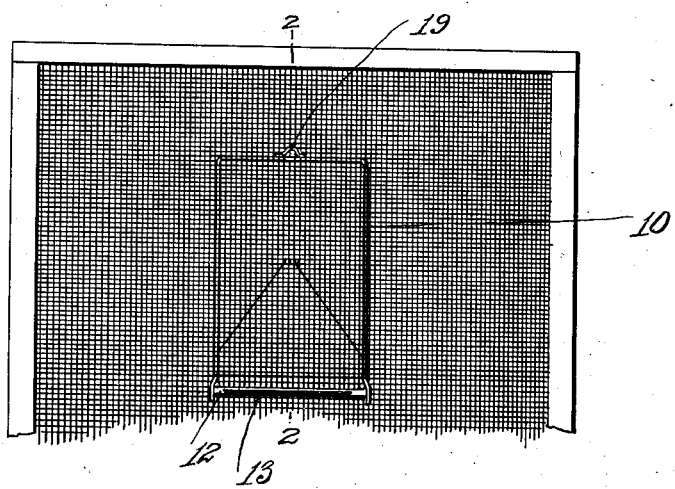
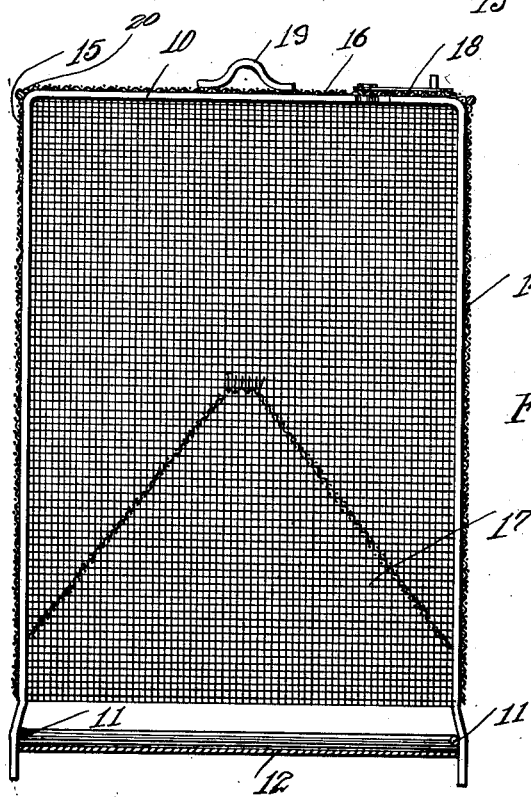
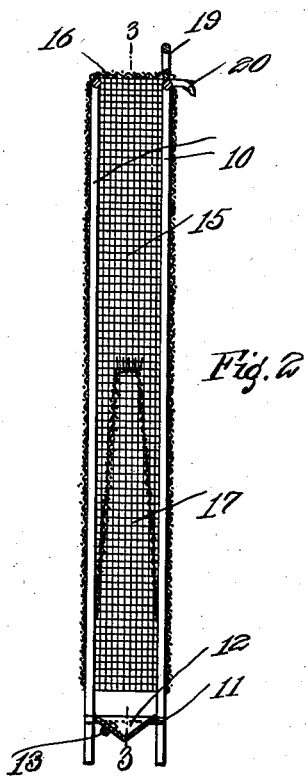
Inventor
Louis H. Koll
Attorney Patented Feb. 23, 1926.

1,574,426

UNITED STATES PATENT OFFICE.

LOUIS H. KOLL, OF CASPER, WYOMING.

FLYTRAP.

Application filed December 4, 1922. Serial No. 604,802.

*To all whom it may concern:*

Be it known that I, LOUIS H. KOLL, a citizen of the United States, residing at Casper, in the county of Natrona, State of Wyoming, have invented certain new and useful Improvements in Flytraps; and I do hereby declare the following to be a full, clear, and exact description of the invention, such as will enable others skilled in the art to which it appertains to make and use the same.

This invention relates to new and useful improvements in traps, and particularly to fly traps.

One object of the invention is to provide a fly trap which may be suspended on a wall, on a window screen, on a screen door, without interfering with the use of the door or window.

Another object is to provide a device of this character which is simple in construction, can be manufactured at a low cost, and which will attract and effectually trap the flies.

Other objects and advantages will be apparent from the following description when taken in connection with the accompanying drawing.

In the drawing:

Figure 1 is an elevation of the trap suspended on a window screen.

Figure 2 is a vertical longitudinal central sectional view through the trap, on line 2—2 of Figure 1.

Figure 3 is a vertical longitudinal central sectional view on the line 3—3 of Figure 2.

Referring particularly to the accompanying drawing, the frame of the trap consists of two angular yokes 10, formed from suitably stiff wire and disposed in parallel planes, with the lower end portions of the arms connected by the cross bars 11. Secured to and extending between cross bars 11 is a narrow trough 12 in which is placed the bait to attract the flies. Secured to the side of the trough is a strip of some brilliantly colored material 13, to attract the flies to the trough.

Secured to, and extending around the frame yokes 10, are the side and end walls 14 and 15, which are formed from woven wire fabric of the ordinary mesh used in screen windows and doors. A strip of the same wire screen material, 16, is secured to the bight portions of the yokes, to form the upper end wall of the enclosure, the bottom being left open, and with the lower edges of the walls 14 and 15 spaced a short distance above the trough.

Disposed within the enclosure is a pyramid 17, of screen fabric, the same having its lower end open, and with the marginal edges secured to the walls 14 and 15, while its upper, or apex end, is provided with a small opening through which the flies enter the enclosure, and are trapped, after crawling up the inner faces of the sides of the pyramid.

In one end portion of the top wall there is formed an opening through which the dead flies are dumped, said opening being closed by a pivoted door 18.

To one of the bight portions there is secured an upwardly extending loop 19 for engagement with a nail or hook, whereby the trap may be suspended on a wall.

Secured to the sides of the upper end of the trap, and extending rearwardly and downwardly therefrom, are the pointed pins 20, which are adapted to be inserted in the mesh of the screen fabric of a window or door, to support the trap.

It will be noted that the strands of the wire, at the apex opening of the pyramid, extend upwardly from the opening, thus preventing the return of the flies through the opening.

By reason of the fact that the trap is comparatively thin, it is adapted to remain on a door or window-screen without interfering with the opening and closing of the window sash, or of the house door.

It will be noted that the trough is considerably narrower than the enclosure, and that the lower marginal edges of the walls of the enclosure are disposed a short distance above and outwardly of the side edges of the trough. By this arrangement, and in view of the fact that flies move upwardly and forwardly, at an angle, when leaving the place of alighting, when the flies leave the trough they are directed upwardly into the pyramid, and when they again alight, it is on the inner face of one of the walls of the pyramid, from whence they crawl upwardly and pass out of the apex opening into the trapping chamber.

What is claimed is:

A fly trap comprising a pair of inverted angular U-shaped wire members disposed in close parallel relation, an elongated trough extending longitudinally between the lower ends of the legs of said members and transversely between the legs of said members and being secured thereto, a reticulated covering secured to the U-shaped members and combining therewith to form an enclosure open at the bottom with the reticulated material terminating a short distance above said trough to permit free entrance of flies to the trough, and a snare within the reticulated enclosure having its lower end secured to the walls of the enclosure a short distance above the lower edges of the reticulated material.

In testimony whereof, I affix my signature.

LOUIS H. KOLL.